(12) United States Patent
Omata

(10) Patent No.: US 8,879,119 B2
(45) Date of Patent: Nov. 4, 2014

(54) IMAGE TONE CONVERSION APPARATUS, RECORDING MEDIUM, AND SYSTEM

(75) Inventor: Shingo Omata, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 115 days.

(21) Appl. No.: 13/300,809

(22) Filed: Nov. 21, 2011

(65) Prior Publication Data

US 2012/0127494 A1    May 24, 2012

(30) Foreign Application Priority Data

Nov. 24, 2010  (JP) ................................ 2010-261154

(51) Int. Cl.
*G06F 15/00*    (2006.01)
*G06K 1/00*     (2006.01)
*G06T 11/00*    (2006.01)
*H04N 1/60*     (2006.01)

(52) U.S. Cl.
CPC ............ *H04N 1/6027* (2013.01); *G06T 11/001* (2013.01)
USPC ........................................................ 358/1.9

(58) Field of Classification Search
USPC .................... 358/1.9, 1.15; 395/131; 715/808; 345/214
See application file for complete search history.

(56) References Cited

U.S. PATENT DOCUMENTS

| 5,630,038 | A | * | 5/1997 | Itoh et al. ....................... 345/594 |
| 7,978,209 | B2 | | 7/2011 | Fukui |
| 2003/0179409 | A1 | * | 9/2003 | Nishida .......................... 358/2.1 |
| 2008/0231892 | A1 | * | 9/2008 | Sugahara et al. ............. 358/1.15 |
| 2009/0167754 | A1 | * | 7/2009 | Hatta ............................. 345/214 |
| 2009/0282365 | A1 | * | 11/2009 | Ogawa et al. .................. 715/808 |

FOREIGN PATENT DOCUMENTS

| CN | 1519713 A | 8/2004 |
| CN | 101227544 A | 7/2008 |
| JP | 08-044867 A | 2/1996 |
| JP | 2003-281562 A | 10/2003 |

OTHER PUBLICATIONS

Japanese Office Action dated Jan. 22, 2013 (and English translation thereof) in counterpart Japanese Application No. 2010-261154.
Chinese Office Action dated Dec. 20, 2013 (and English translation thereof) in counterpart Chinese Chinese Application No. 201110399519.8.

* cited by examiner

*Primary Examiner* — Marivelisse Santiago Cordero
*Assistant Examiner* — Michael Burleson
(74) *Attorney, Agent, or Firm* — Holtz, Holtz, Goodman & Chick PC

(57) ABSTRACT

An image tone conversion apparatus includes: a region specifying section configured to specify a region of an original image, to which region an image tone conversion is to be performed; an image tone specifying section configured to specify a different type of image tone in accordance with an elapsed time since the region specifying section has specified the region; an image converting section configured to convert an tone of the original image in the region specified by the region specifying section to the image tone specified by the image tone specifying section; and a superimposing section configured to superimpose the image in the region to which the image tone conversion has been performed by the image converting section on the region of the original image specified by the region specifying section.

6 Claims, 17 Drawing Sheets

FIG.4

| P(1) | P(2) | P(3) | · · · | P(n) |
|---|---|---|---|---|
| P(n+1) | P(n+2) | P(n+3) | · · · | P(2n) |
| P(2n+1) | P(2n+2) | P(2n+3) | · · · | P(3n) |
| ⋮ | ⋮ | ⋮ | | ⋮ |
| | | | | P(n×m) |

ORIGINAL IMAGE (1)

ORIGINAL IMAGE (1)

WINDOW IMAGE

ORIGINAL IMAGE (2)

ORIGINAL IMAGE (2)

WINDOW IMAGE

IMAGE TONE CONVERSION APPARATUS, RECORDING MEDIUM, AND SYSTEM

CROSS-REFERENCE TO RELATED APPLICATIONS

This application is based upon and claims the benefit of priority from the prior Japanese Patent Application No. 2010-261154 filed on Nov. 24, 2010, the entire contents of which are incorporated herein by reference.

BACKGROUND OF THE INVENTION

1. Field of the Invention

The present invention relates to an image tone conversion apparatus, recording medium, and system.

2. Description of the Related Art

A technique for converting an image to a painting-like image has been known. As such kind of technique, for example, Japanese Patent Application Laid-Open Publication No. H8-44867 discloses a technique for converting an original image to an oil-painting-like picture by correcting each portion of the original image to have more uniform brightness, color saturation, and hue to represent a so-called brush stroke, or by detecting contrast edges of the original image and correcting brightness along the detected contrast edges to emphasize contour lines.

When performing an image tone conversion such as conversion from a desired region of an original image to a painting-like image, first of all, the desired region is trimmed and cut out from the original image. Then, the image tone conversion is performed to the trimmed and cutout region of the image in accordance with an image tone selected among various kinds of image tones (water color painting, oil painting (impressionist school), oil painting (fauve), Gouache painting, and pastel painting). However, if such image to which the image tone conversion is performed is not what is intended by a user, the user has to do the conversion process all over again, which forces the user to do extremely complicated work. In other words, there is a problem that it is impossible to easily convert the desired region of the original image to various kinds of image tones without trimming the image.

BRIEF SUMMARY OF THE INVENTION

The present invention is made in view of such circumstances, and an object of the present invention is to provide an image tone conversion apparatus, recording medium, and system for easily converting a desired region of an original image to various kinds of image tones without trimming the image.

According to the first aspect of the present invention, an image tone conversion apparatus includes: a region specifying section configured to specify a region of an original image, to which region an image tone conversion is to be performed; an image tone specifying section configured to specify a different type of image tone in accordance with an elapsed time since the region specifying section has specified the region; an image converting section configured to convert an tone of the original image in the region specified by the region specifying section to the image tone specified by the image tone specifying section; and a superimposing section configured to superimpose the image in the region to which the image tone conversion has been performed by the image converting section on the region of the original image specified by the region specifying section.

According to the second aspect of the present invention, a recording medium records a program which makes a computer execute the functions of: a region specifying function for specifying a region of an original image, to which region an image tone conversion is to be performed; an image tone specifying function for specifying a different type of image tone in accordance with an elapsed time since the region specifying function has specified the region; an image converting function for converting an tone of the original image in the region specified by the region specifying function to the image tone specified by the image tone specifying function; and a superimposing function for superimposing the image in the region to which the image tone conversion has been performed by the image converting function on the region of the original image specified by the region specifying function.

According to the third aspect of the present invention, a system includes; a terminal apparatus; and a server connected to the terminal apparatus via a network, wherein the terminal apparatus includes: a region specifying section configured to specify a region of an original image, to which region an image tone conversion is to be performed, and wherein the server includes: an image tone specifying section configured to specify a different type of image tone in accordance with an elapsed time since the region specifying section has specified the region; an image converting section configured to convert an tone of the original image in the region specified by the region specifying section to the image tone specified by the image tone specifying section.

BRIEF DESCRIPTION OF THE SEVERAL VIEWS OF THE DRAWINGS

The present invention will sufficiently be understood by the following detailed description and accompanying drawing, but they are provided for illustration only, and not for limiting the scope of the invention:

FIG. 4 is a diagram for explaining a data format of image data;

DETAILED DESCRIPTION OF THE INVENTION

An embodiment of the present invention will be hereinafter explained with reference to the drawings.

A. Configuration (1) Summary of System (Summary of the Invention)

Figure 1:
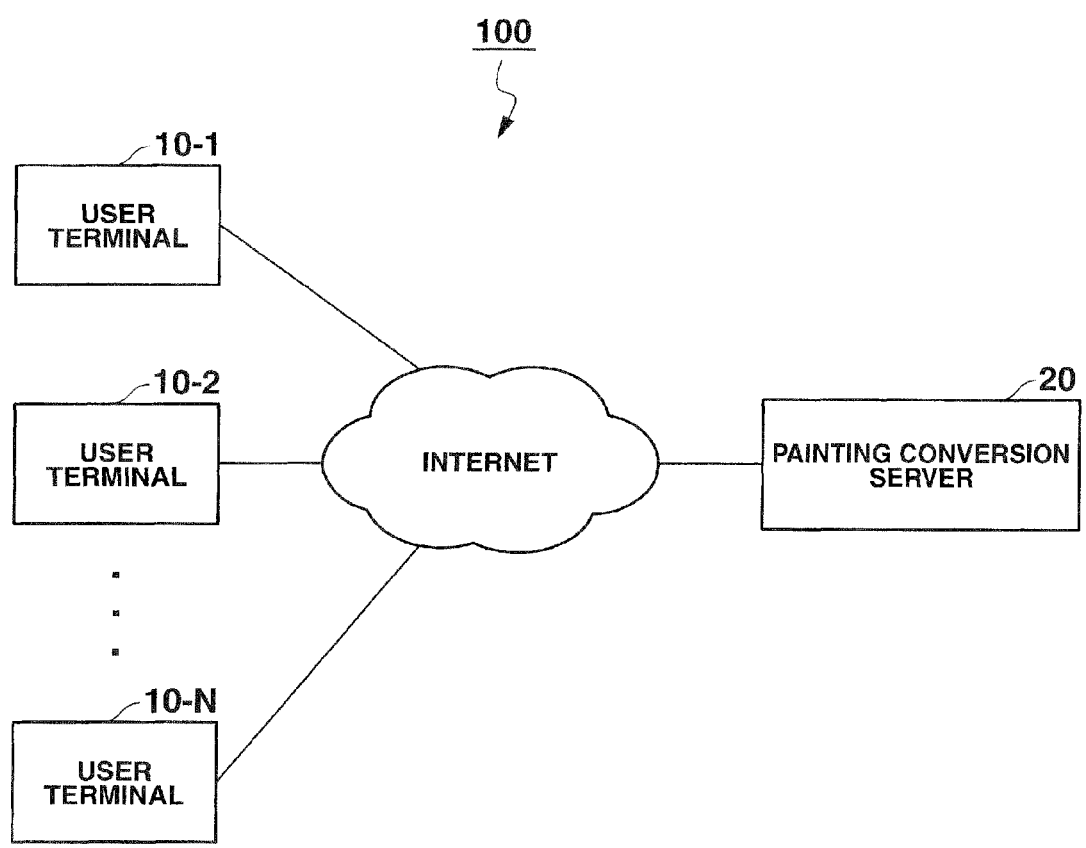
FIG. 1 is a block diagram showing an entire configuration of a painting conversion system 100 according to an embodiment.
Figure 2:
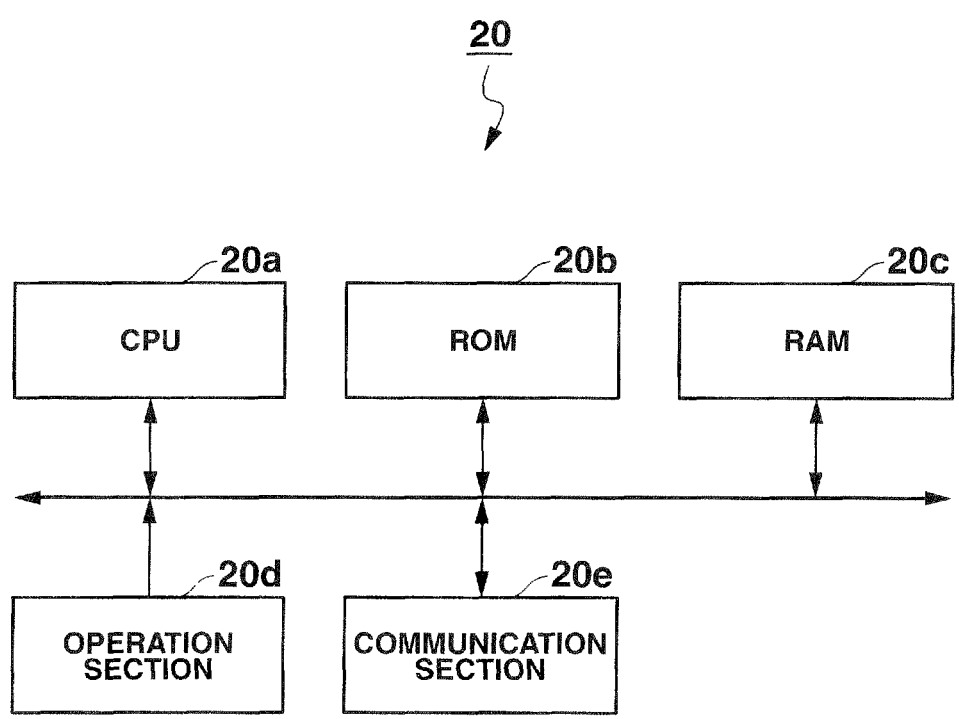
FIG. 2 is a block diagram showing a configuration of a painting conversion server 20.

FIG. 1 is a block diagram showing an entire configuration of a painting conversion system 100 according to an embodiment. The painting conversion system 100 shown in this diagram includes a plurality of user terminals 10-1 to 10-N which access a painting conversion server 20 via the Internet. Each of the user terminals 10 is constituted by a personal computer having an Internet connection function and a browser function.

Figure 12:
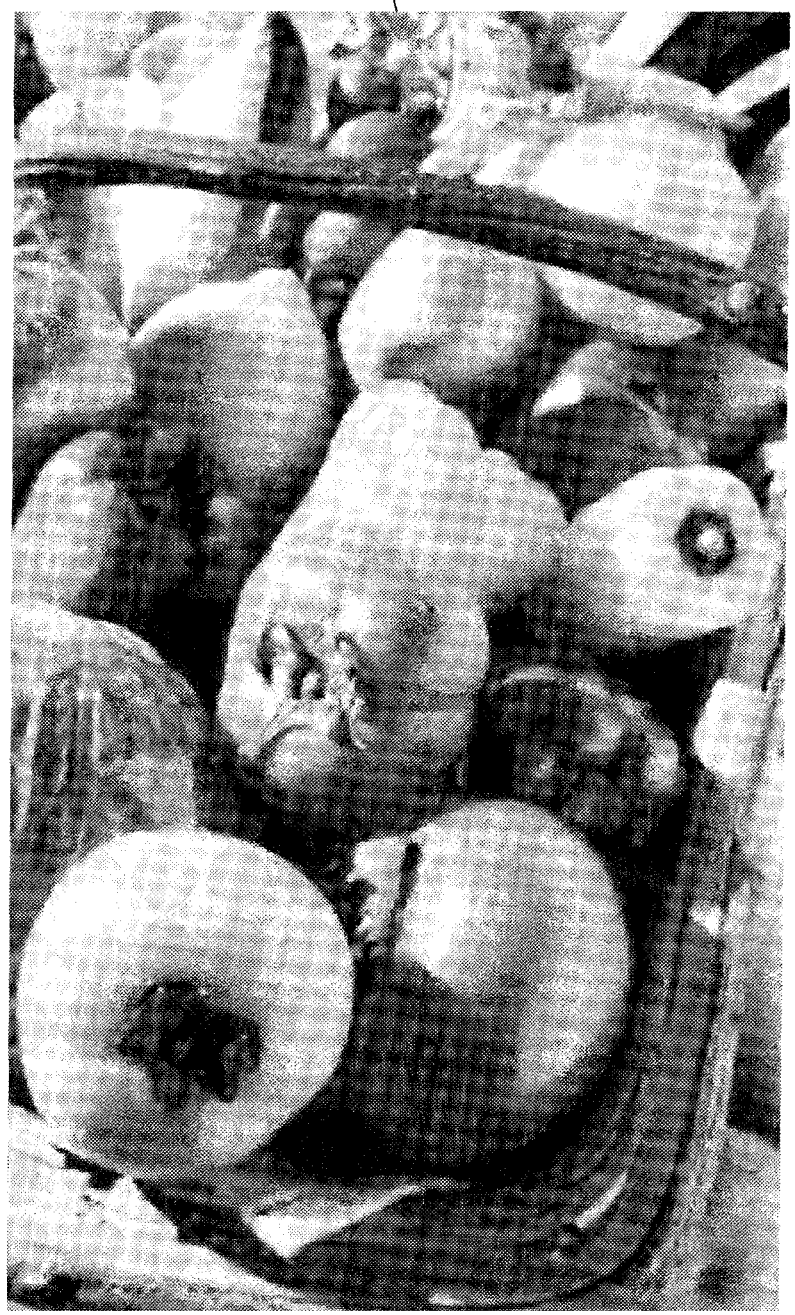
FIG. 12 is an image showing an example of an original image (1)

When each of the user terminals 10 accesses the painting conversion server 20 via the Internet and changes a display page from a top page to a painting conversion page, each of the user terminals 10 receives an original image transmitted from the painting conversion server 20 to display the original image on a screen. The original image means, for example, an original image whose tone has not been converted to a painting-like tone, such as an original image (1) shown in FIG. 12 and an original image (2) shown in FIG. 15.

In the painting conversion page, a plurality of original images (1) to (N) are displayed on the screen. Each of the user terminals 10 arranges a window image, whose frame size and arrangement position can be changed in accordance with user operation, in one of the original images (1) to (N) whose tone is desired to be converted to a painting-like tone. Concretely, a window image which encloses a portion extending from a center of the original image (1) to a lower portion thereof may be arranged as shown in FIG. 13, or a window image which encloses a lower right portion of the original image (2) may be arranged as shown in FIG. 16.

Figure 13:
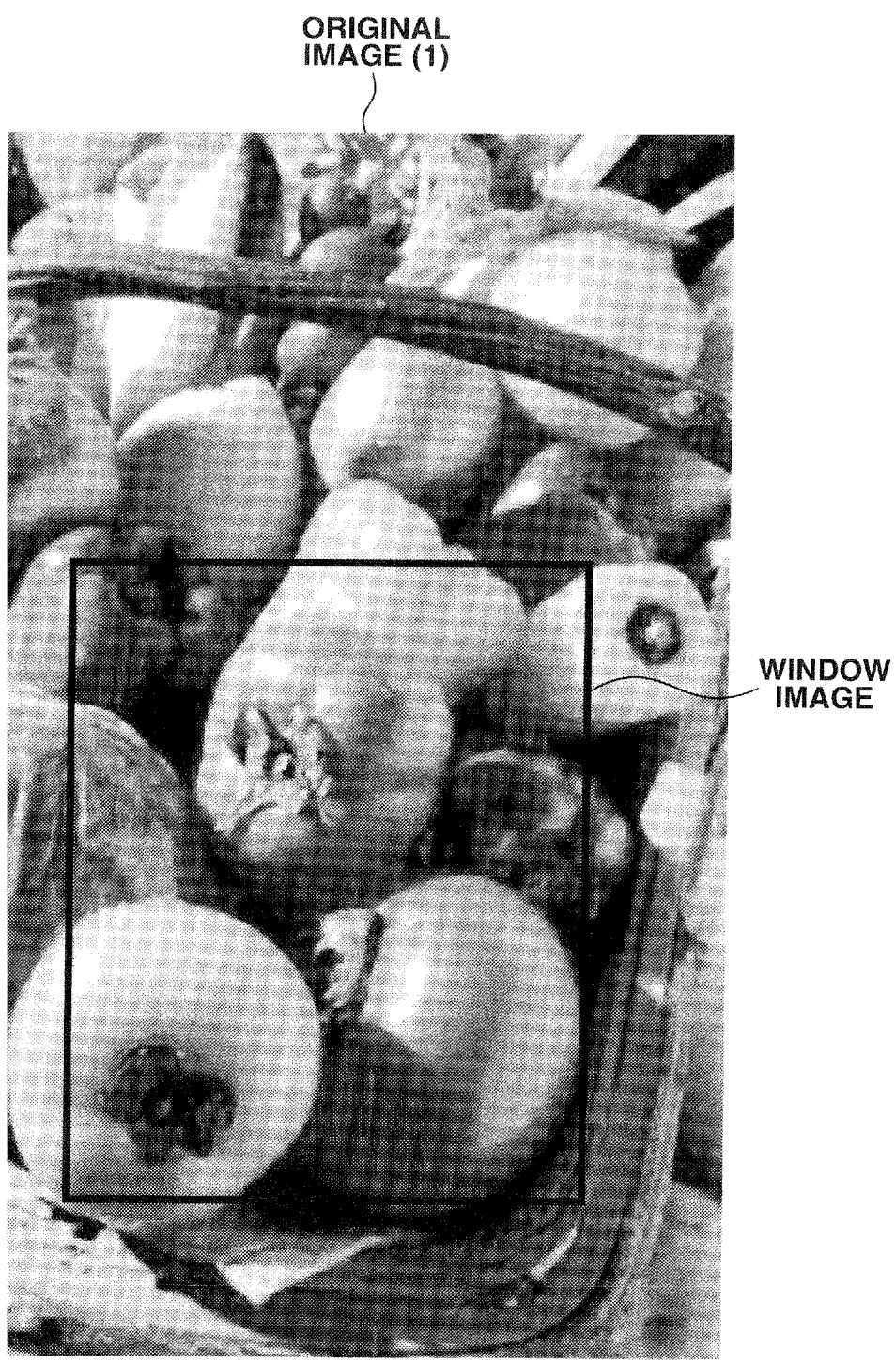
FIG. 13 is an image in which a window image is overlaid on the original image (1)
Figure 16:
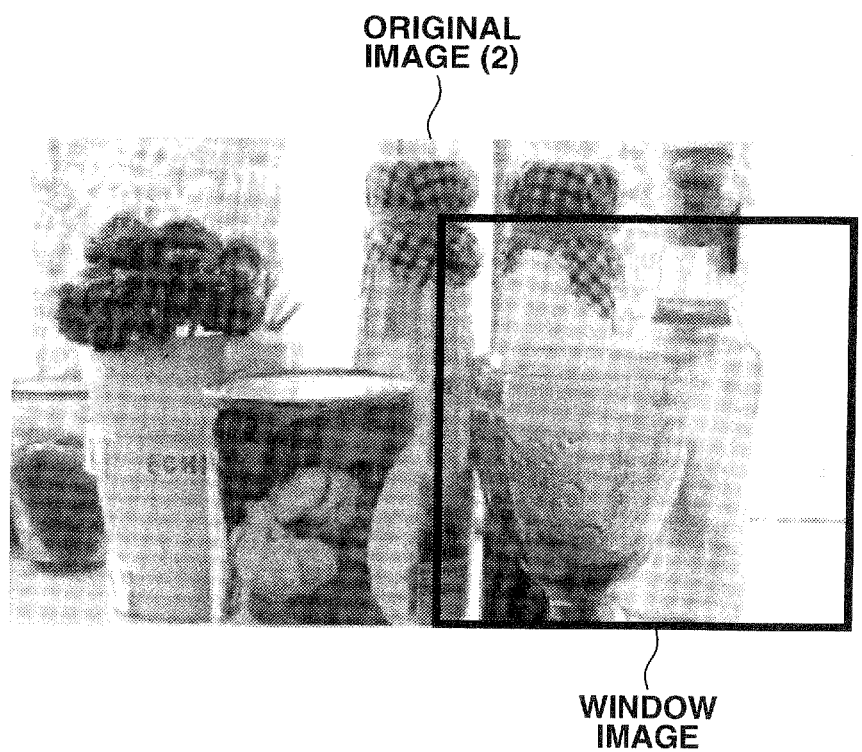
FIG. 16 is an image in which a window image is overlaid on the original image (2)

In the examples shown in FIGS. 13 and 16, black-framed window images are shown, but it is preferable to use a window image having a shape imitating a frame. In other words, the window image arranged in the original image is to specify an image region, a tone of which is to be converted to a painting-like tone, and therefore, when the window image is imitating a frame, it is possible to allow the image region, a tone of which has been converted to the painting-like tone, to appear as a picture set in a frame.

When each of the user terminals 10 specifies the image region of the original image, a tone of which is desired to be converted to the painting-like tone using the window image, size data and position data respectively representing the frame size and arrangement position of the window image are transmitted to the painting conversion server 20. The painting conversion server 20 converts, to the painting-like tone, a tone of the image region of the original image enclosed by the window image which is specified with the size data and position data supplied from each of the user terminals 10, and pastes the region of the image whose tone has been converted to the painting-like tone to the region of the original image enclosed by the window image to transmit the obtained image to each of the user terminals 10.

Figure 14:
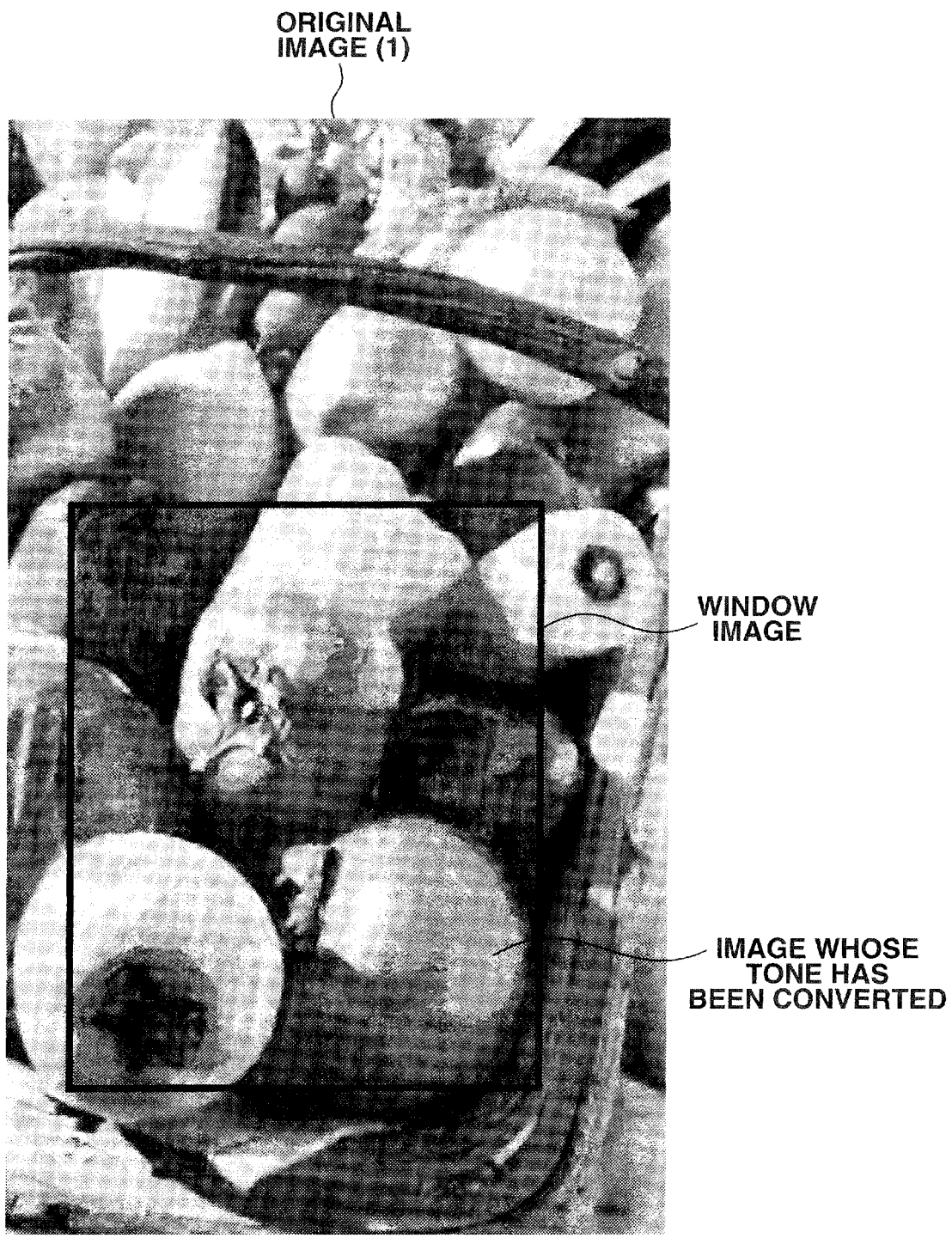
FIG. 14 is an example of an image in which a tone inside the window image overlaid on the original image (1) is converted to an oil painting.
Figure 17:
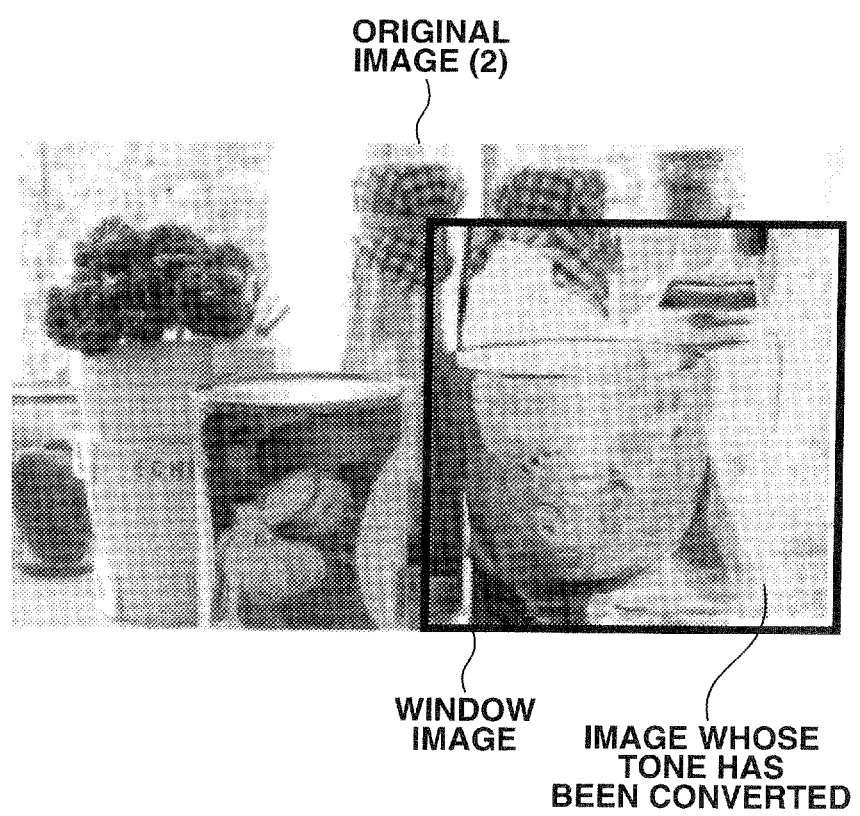
FIG. 17 is an example of an image in which a tone inside the window image overlaid on the original image (2) is converted to an oil painting.

As a result, as shown in the examples of FIGS. 14 and 17, each of the user terminals 10 displays the image in which a tone of the original image in the region enclosed by the window image is converted to an oil-painting tone. Then, the painting conversion server 20 changes conversion algorithm/parameter group as the time passes, which is used when converting the image region of the original image specified with the size data and position data supplied from each of the user terminals 10 to the painting-like tone. More specifically, the painting conversion server 20 changes the conversion algorithm/parameter group which is used in the painting-like tone conversion process to "oil painting", "water color painting", and "pastel painting" in this order, for example, in accordance with an elapsed time since the frame size and arrangement position of the window image arranged in the original image have been specified.

In this manner, each of the user terminals 10 converts a tone of the image in the region enclosed by the window image to the painting-like tones, i.e., "oil painting", "water color painting", and "pastel painting" in this order every time a predetermined period of time passes and displays these painting-like tones, merely by specifying the region of the original image whose tone is to be converted to a painting-like tone with the window image. Thus, unlike a conventional example, it is not necessary to perform cumbersome operations such as doing the process all over again when the trimmed and cut out image region whose tone has been converted to the painting-like tone is not what is intended by the user. As a result, a tone of a desired region of the original image can be easily converted to various kinds of image tones without trimming the image.

(2) Configuration of Painting Conversion Server 20

Subsequently, a configuration of the painting conversion server 20 will be explained with reference to FIGS. 2 to 5A-5D. The painting conversion server 20 includes constituent elements 20A to 20E. The CPU 20A controls each section of the server in accordance with an operation event generated by the operation section 20D. The processing operation (server processing) performed by the CPU 20A according to the gist of the present invention will be explained later in detail. The ROM 20B stores various kinds of control programs and control data which are loaded by the CPU 20A. The various kinds of control programs include server processing explained later.

Figure 3:
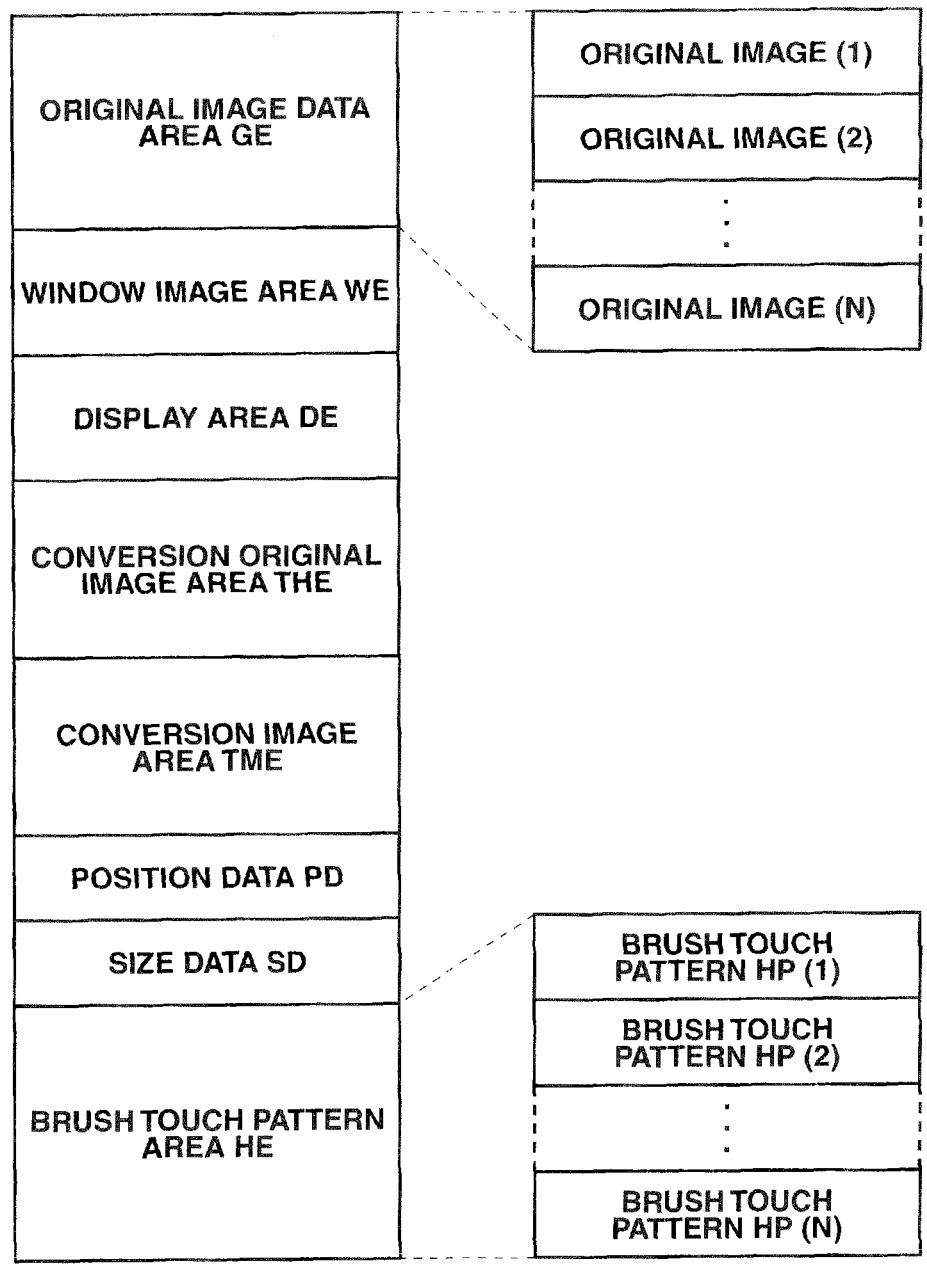
FIG. 3 is a memory map showing a memory configuration of a RAM 20C.
Figure 4:
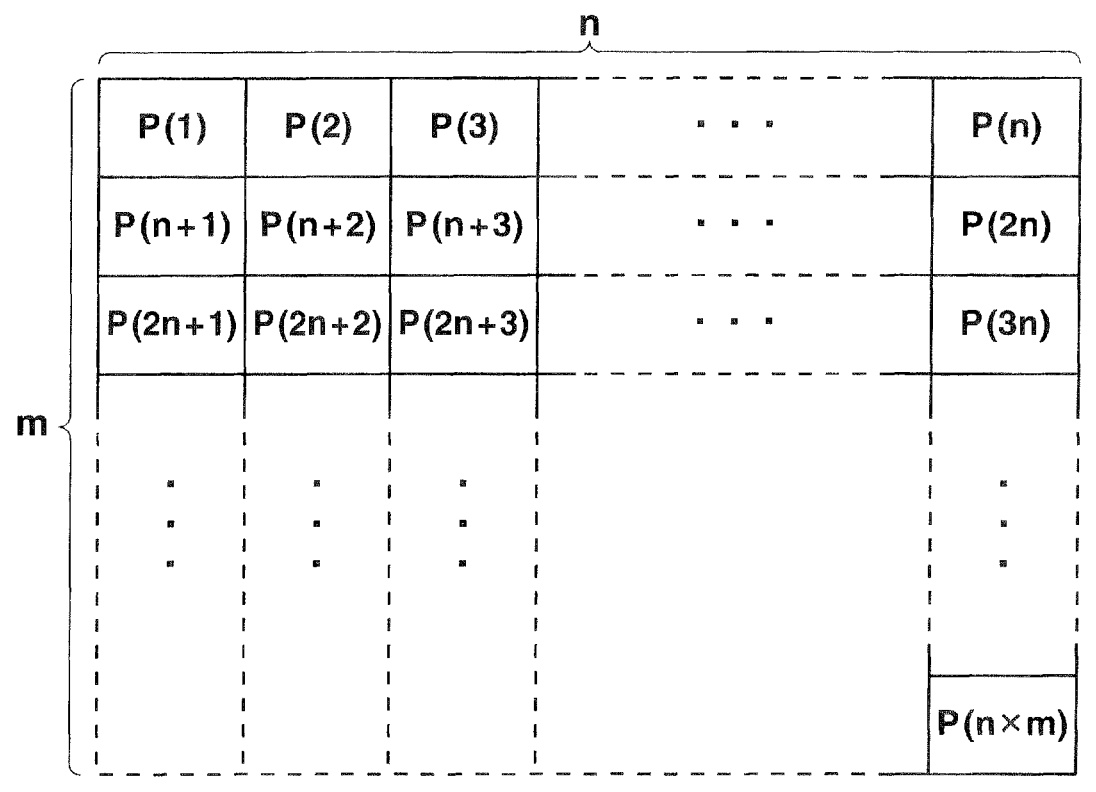

As shown in FIG. 3, the RAM 20C includes an original image data area GE, a window image area WE, a display area DE, a conversion original image area THE, a conversion image area TME, an area for storing position data PD, an area for storing size data SD, and a brush-touch pattern area HE. The original image data area GE stores a plurality of original images (1) to (N). The original images (1) to (N) are copied to the display area DE as an image group to be displayed in the painting conversion page. For the sake of simplifying the explanation, the image used in the present embodiment is assumed to be represented as a known bitmap format including, e.g., pixels P (1) to P (n×m) in n rows and m columns as shown in FIG. 4.

The window image area WE stores the window image of the black frame as shown in examples of FIGS. 13 and 16, for example. The conversion original image area THE is a work area for the painting-like tone conversion, and temporarily stores the image whose tone is to be converted to the painting-like tone, i.e., image data of the region enclosed by the window image arranged in the original image. The conversion image area TME temporarily stores image data obtained by performing the painting-like tone conversion on the image temporarily stored in the conversion original image area THE on the basis of the conversion algorithm/parameter.

The area for storing the position data PD stores the position data PD representing the position of the window image arranged in the original image. The position of the window image represented by the position data PD is, for example, a coordinate position of the upper left corner of the frame formed by the window image, which is received from each of the user terminals 10. The area for storing the size data SD stores the size data SD representing the size of the window image arranged in the original image. The size of the window image represented by the size data SD includes, for example, the length of the diagonal line and aspect ratio (ratio between the vertical length and the horizontal length) of the frame formed by the window image, which is received from each of the user terminals 10.

The brush-touch pattern area HE stores a plurality of types of brush-touch patterns HP (1) to HP (N) representing brush touch figures (touch shapes). These brush-touch patterns HP (1) to HP (N) are used when an image stored in the above conversion original image area THE (image of the region enclosed by the window image arranged in the original image) is converted to a painting-like image.

For example, in the case of a brush touch figure of oil painting, the brush-touch patterns HP (1) to HP (4) of the examples shown in FIGS. 5A-5D are registered to the brush-touch pattern area HE. The brush-touch pattern HP (1) includes ten pixels forming a brush touch FIG. 1. The brush-touch pattern HP (2) includes thirteen pixels forming a brush touch FIG. 2. The brush-touch pattern HP (3) includes thirteen pixels forming a brush touch FIG. 3. The brush-touch pattern HP (4) includes nine pixels forming a brush touch FIG. 4.

The operation section 20D includes input devices such as a keyboard and a mouse, and generates an operation event in accordance with input. The operation event is taken to the CPU 20A. The communication section 20E exchanges data with each of the user terminals 10 making access via the Internet under the control of the CPU 20A.

B. Operation

Subsequently, an operation of the configuration according to the embodiment will be explained with reference to FIGS. 6 to 17. In the explanation below, first, terminal processing executed by each of the user terminals 10 will be explained, and thereafter, server processing executed by the painting conversion server 20 will be explained. The server processing includes image conversion processing and conversion processing.

(1) Operation of Terminal Processing

Figure 6:
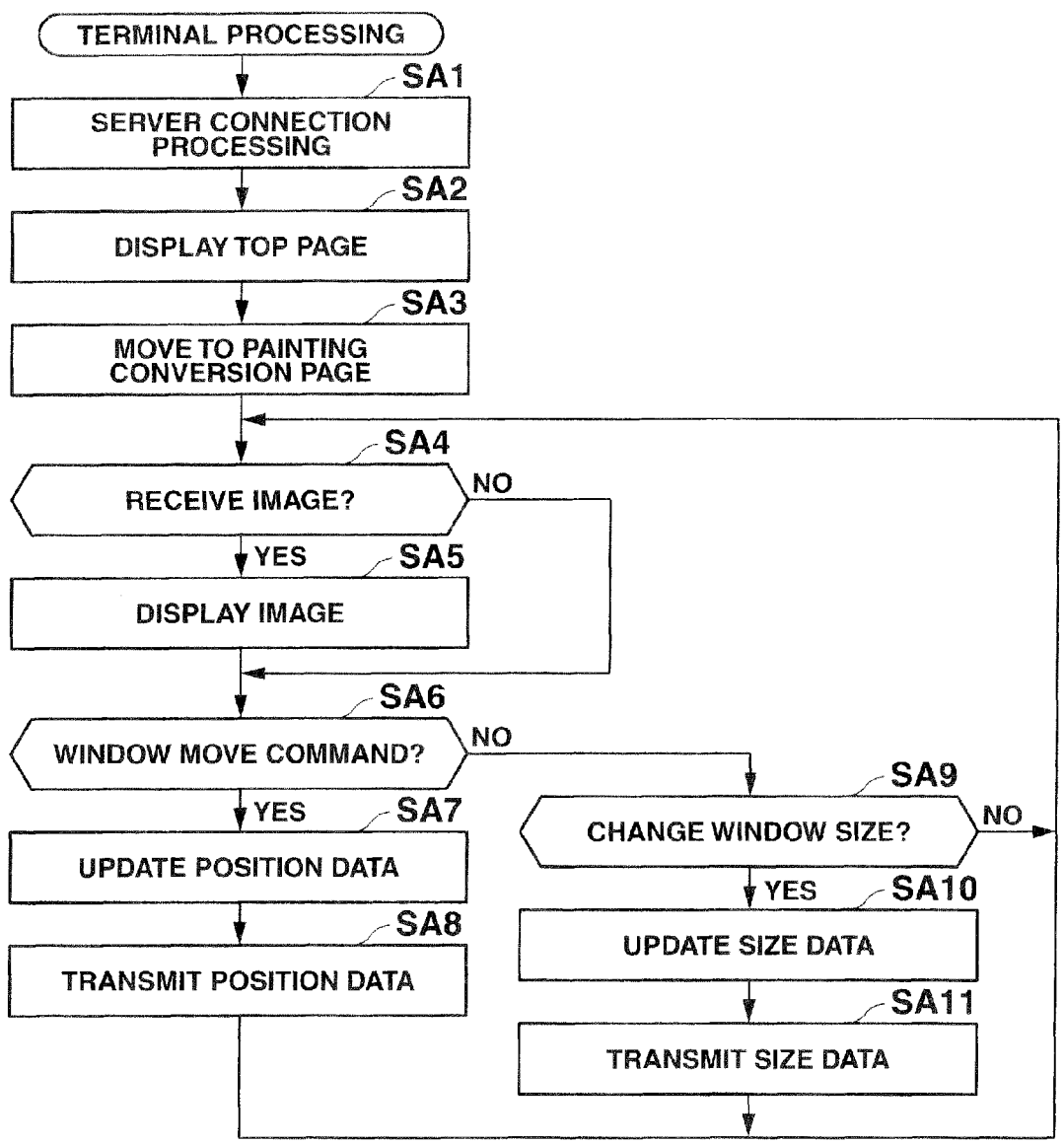
FIG. 6 is a flowchart showing an operation of terminal processing.

When each of the user terminals 10 composed of a personal computer having the Internet connection function and browser function executes terminal processing as shown in FIG. 6, first, server connection processing is performed to establish network connection with the painting conversion server 20 in step SA1. Then, when the network connection with the painting conversion server 20 is established, step SA2 is subsequently performed, in which a top page provided by the painting conversion server 20 is displayed on the screen. Subsequently, step SA3 is performed. When the display page is changed from the top page to the painting conversion page in accordance with user operation, step SA4 is subsequently performed, in which a judgment is made as to whether the original image and the window image transmitted from the painting conversion server 20 have been received.

When the display page changes from the top page to the painting conversion page, the original images (1) to (N) and the default window image are received, and therefore, a judgment result made in above step SA4 becomes "YES", a window image and a selected one of the original images (1) to (N) received from the painting conversion server 20 are displayed on the screen. Accordingly, for example, the original image (1) shown in FIG. 12, the original image (2) shown in FIG. 15, or the like is displayed on the screen by a displaying member (not shown) of each of the user terminals 10. It should be noted that the default window image is a window image of a predetermined size displayed at a predetermined position of the painting conversion page.

When one of the original images (1) to (N) is displayed on the screen, judgments are made as to whether a window movement command operation is given and whether a window size change operation is given in steps SA6 and SA9. The window movement command operation is an operation using an input device such as a mouse for arranging the window image received from the painting conversion server 20 in the displayed original image. The window size change operation is an operation using an input device such as a mouse for setting the frame size of the window image arranged in the original image by the window movement command operation.

When the user executes the window movement command operation, a judgment result made in step SA6 becomes "YES", and subsequently, step SA7 is performed, in which the position data PD is updated in accordance with the window movement command operation. In step SA8 subsequent thereto, the updated position data PD is transmitted to the painting conversion server 20, and thereafter, the processing returns back to step SA4. It should be noted that the position data PD referred to herein is, for example, the coordinate position at the upper left corner of the frame formed by the window image as described above.

When the user executes the window size change operation, a judgment result of step SA9 becomes "YES", and step SA10 is subsequently performed, in which the size data SD is updated in accordance with the window size change operation. Then, in step SA11 subsequent thereto, the updated size data SD is transmitted to the painting conversion server 20, and thereafter the processing returns back to step SA4. It should be noted that the size data SD referred to herein is, for example, data including the length of the diagonal line and the aspect ratio (ratio between the vertical length and the horizontal length) of the frame formed by the window image as described above.

Figure 15:
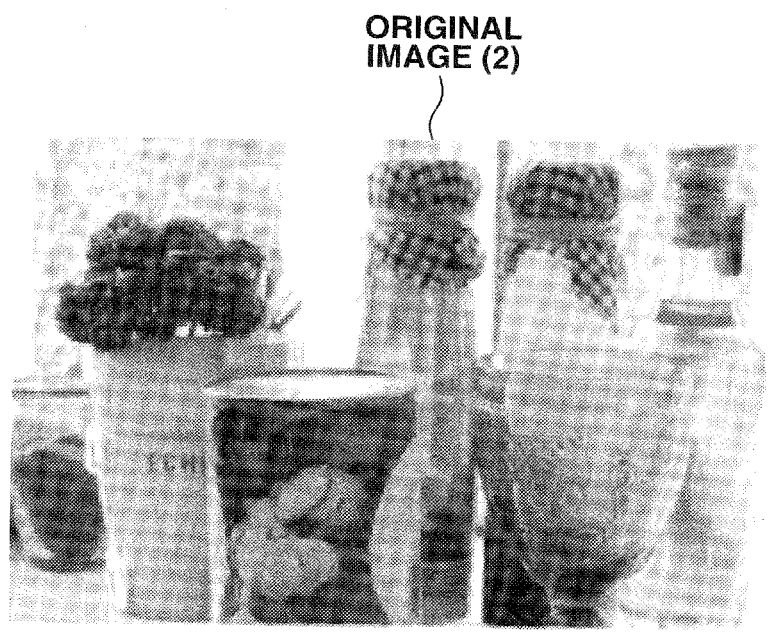
FIG. 15 is an image showing an example of an original image (2)

Then, when the window movement command operation and the window size change operation are performed, the painting conversion server 20 converts, to the painting-like tone, a tone of the original image in the region enclosed by the window image whose position or size is updated, pastes the region of the image whose tone has been converted to the painting-like tone on the region of the original image enclosed by the window image, and transmits the image to each of the user terminals 10. Then, the judgment result made in step SA4 becomes "YES", and step SA5 is subsequently performed, in which the original image whose tone in the region enclosed by the window image has been converted to the painting-like tone, i.e., the original image of the example shown in FIG. 14 or 15, is displayed on the screen by the displaying member (not shown) of each of the user terminals 10.

As described above, in the terminal processing executed by each of the user terminals 10, when each of the user terminals 10 accesses the painting conversion server 20 and moves from the top page to the painting conversion page, each of the user terminals 10 receives the window image and the original image selected from among the original images (1) to (N) transmitted from the painting conversion server 20, and displays the image on the screen. When the window image of a desired frame size is arranged at a desired position in the original image displayed on the screen in accordance with the window movement command operation and the window size change operation, the position data PD representing the position of the window image and the size data SD representing the size are generated and transmitted to the painting conversion server 20.

Then, the painting conversion server 20 converts a tone of the original image in the region enclosed by the window image to the painting-like tone on the basis of the window image whose position or size is updated in accordance with the window movement command operation and the window size change operation. The painting conversion server 20 then pastes the region of the image whose tone has been converted to the painting-like tone on the region of the original image enclosed by the window image, and transmits the image to each of the user terminals 10. Each of the user terminals 10 receives the image and displays the received image on the screen.

(2) Operation of Server Processing

Figure 7:
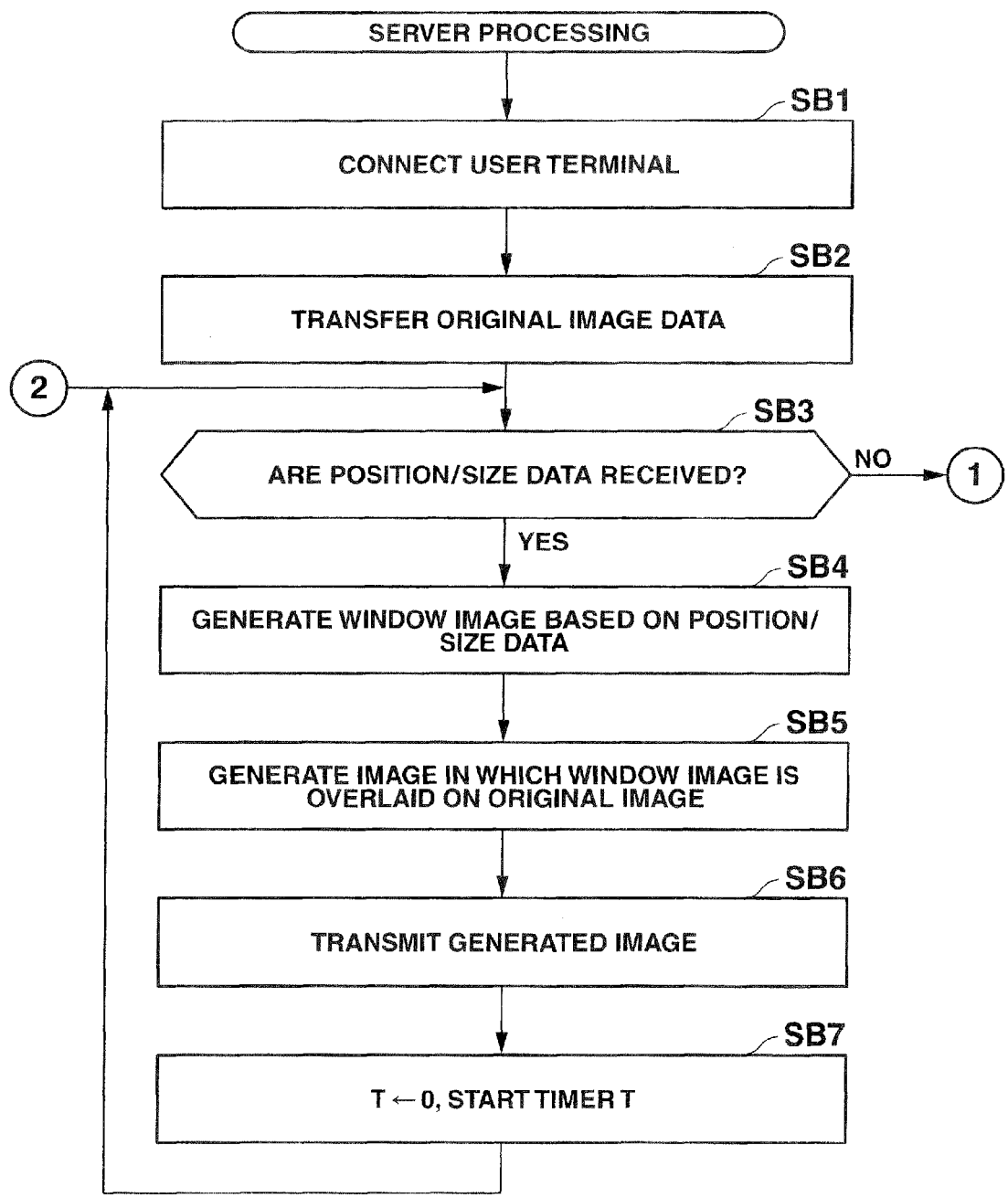
FIG. 7 is a flowchart showing an operation showing server processing.
Figure 8:
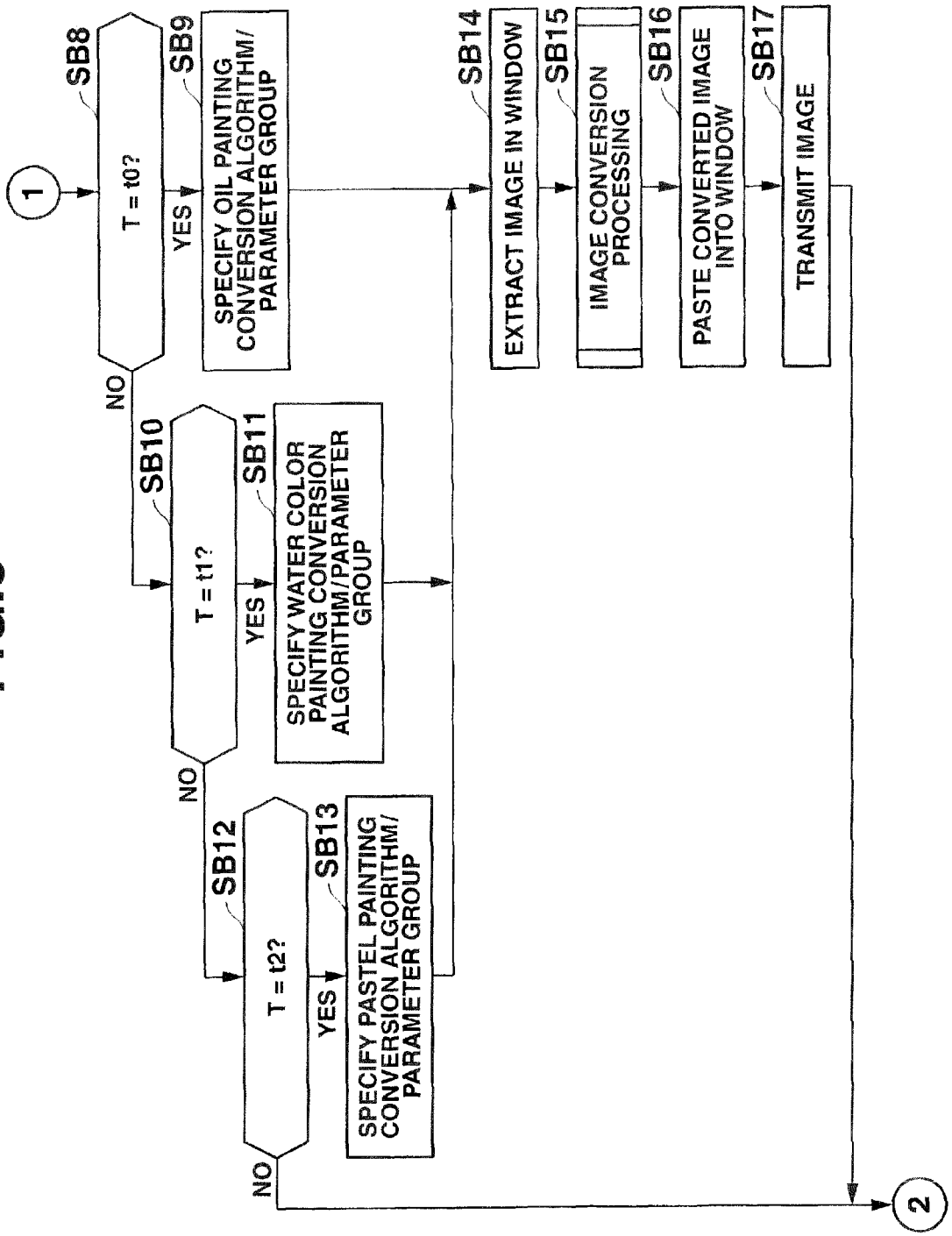
FIG. 8 is a flowchart showing an operation showing server processing.

Subsequently, an operation of the server processing executed by the painting conversion server 20 will be explained with reference to FIGS. 7 to 8. First, in step SB1 as shown in FIG. 7, the painting conversion server 20 establishes connection with each of the user terminals 10 which accesses the painting conversion server 20 via the Internet. Then, when each of the user terminals 10 with which the connection is established gives a move request to the painting conversion page, step SB2 is subsequently performed, in which the window image and the original images (1) to (N) copied to the display area DE are transferred to each of the user terminals 10. As a result, each of the user terminals 10 displays the painting conversion page on the screen. The painting conversion page includes the window image and the original image selected among the original images (1) to (N).

Subsequently, in step SB3, a judgment is made as to whether any one of the position data PD and the size data SD has been received from each of the user terminals 10. When the position data PD or the size data SD updated according to the window movement command operation or the window size change operation made at each of the user terminals 10 is received, the judgment result becomes "YES", and step SB4 is subsequently performed. Then, in steps SB4 and SB5, a window image corresponding to the size data SD is created, and an image is created in which the created window image is overlaid on the original image at the position specified by the position data PD.

Subsequently, in step SB6, the image created by overlaying the window image updated according to the position data PD or the size data SD on the original image is transmitted to each of the user terminals 10. Subsequently, in step SB7, a timer T is initialized to zero, and the timer T is started. Thereafter, the processing returns back to step SB3, and when none of the position data PD or size data SD is received from each of the user terminals 10, the judgment result becomes "NO", and step SB8 shown in FIG. 8 is subsequently performed.

In steps SB8 to SB13, the conversion algorithm/parameter group used for the painting-like tone conversion is changed in the original image displayed on the screen in accordance with the elapsed time measured with the timer T since the window image of a desired frame size has been arranged at a desired position. In other words, when a time t0 passes since the start of the timer, the judgment result made in step SB8 becomes "YES", and step SB9 is subsequently performed. After the oil painting conversion algorithm/parameter group is specified, step SB14 is subsequently performed.

When a time t1 passes since the start of the timer, the judgment result made in step SB10 becomes "YES", and step SB11 is subsequently performed. After the water color painting conversion algorithm/parameter group is specified, step SB14 is subsequently performed. When a time t2 passes since the start of the timer, the judgment result made in step SB12 becomes "YES", and step SB13 is subsequently performed. After the pastel painting conversion algorithm/parameter group is specified, step SB14 is subsequently performed.

Then, in step SB14, the image in the region of the original image enclosed by the window image is extracted. Subsequently, in step SB15, image conversion processing is executed in which a tone of the image in the region extracted in step SB14 is converted to the painting-like tone in accordance with the conversion algorithm/parameter group currently selected. The image conversion processing will be explained later in detail.

Subsequently, in steps SB16 and SB17, the converted image obtained in the image conversion processing in step SB15 is pasted in the region of the original image enclosed by the window image, and the image is transmitted to each of the user terminals 10. Thereafter, the processing returns back to step SB3 (see FIG. 7) explained above, and when the position data PD or the size data SD is updated in accordance with the window movement command operation or the window size change operation performed with each of the user terminals 10, the operations in steps SB3 to SB17 are repeated again.

(3) Operation of Image Conversion Processing

Subsequently, an operation of the image conversion processing will be explained with reference to FIGS. 9 to 11A-11C. When the processing is executed in step SB15 (see FIG. 8) of the server processing explained above, the painting conversion server 20 proceeds to step SCI shown in FIG. 9, and selects and sets a brush touch pattern specified by the currently-selected conversion algorithm/parameter group among the various kinds of brush-touch patterns HP (1) to (N) stored in the brush-touch pattern area HE (see FIG. 3). In this case, for the sake of simplifying the explanation, it is assumed that the brush-touch pattern HP (1) for conversion to oil painting is set, for example. Subsequently, the conversion processing is executed in step SC2.

Figure 10:
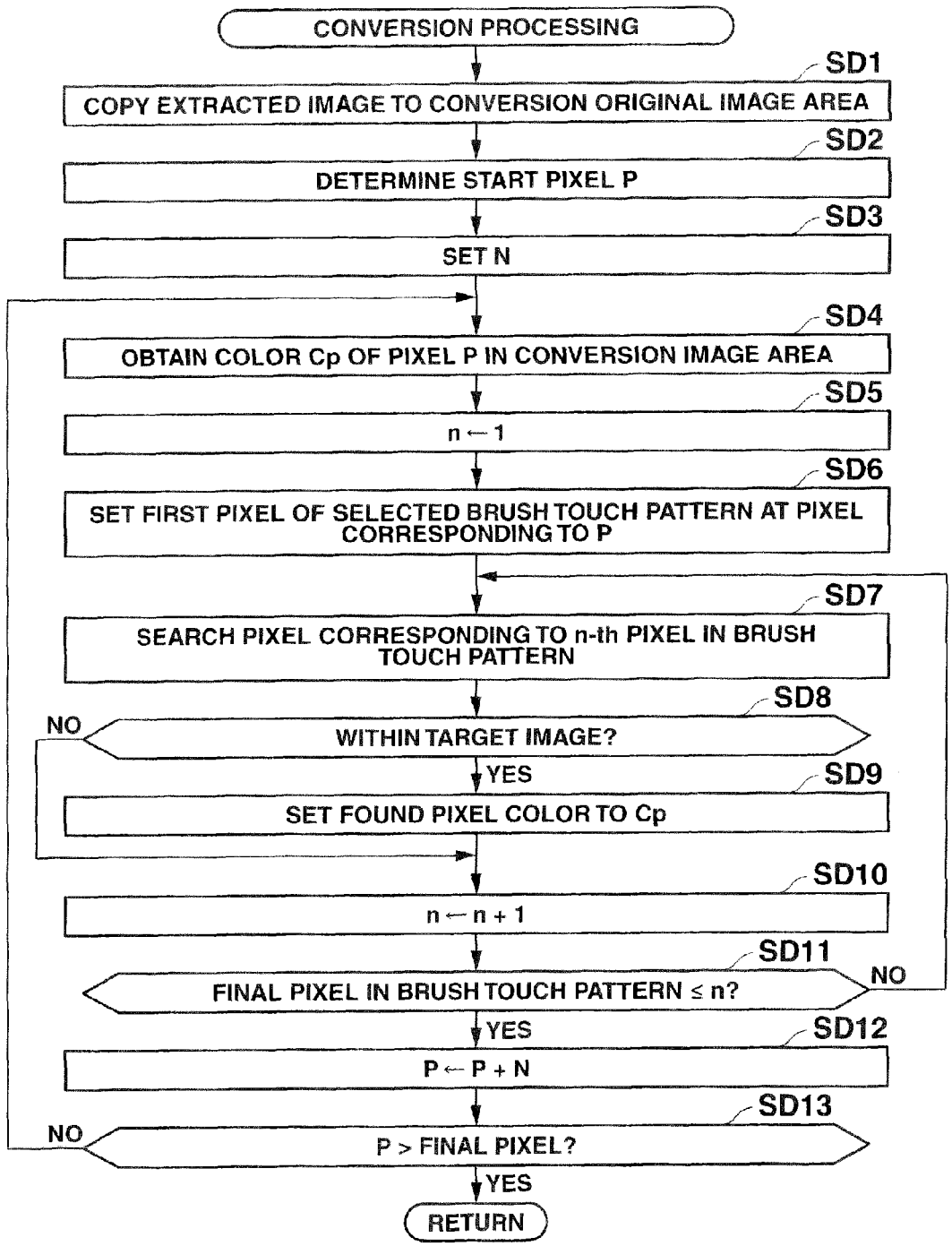
FIG. 10 is a flowchart showing an operation showing conversion processing.
Figure 11A:
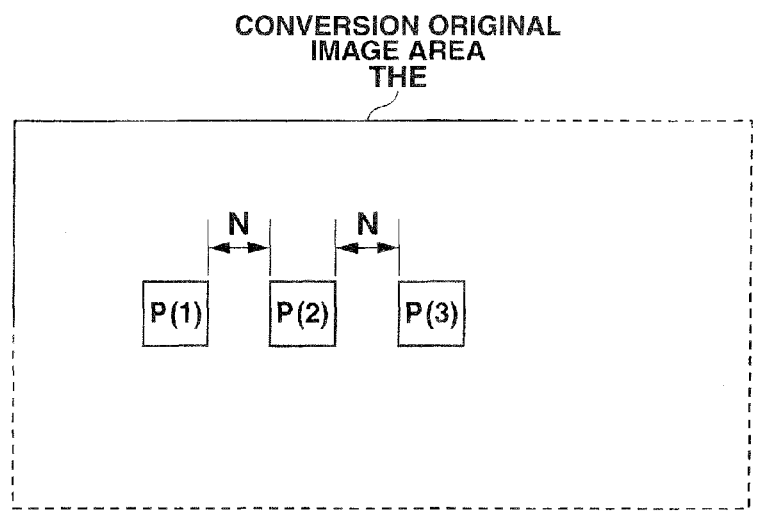
FIG. 11A is a diagram for explaining an example of an operation of image conversion processing.

When the conversion processing is executed, the painting conversion server 20 proceeds to step SD1 shown in FIG. 10. In step SD1, the image extracted in step SB14 (see FIG. 8) of the above server processing, i.e., the image data in the region of the original image enclosed by the window image, is copied to the conversion original image area THE. Subsequently, a start pixel P from which conversion is started is set in step SD2. Any one of the pixels P (1) to P (n×m) in the bitmap format is selected as the start pixel P. More specifically, for example, the pixel P (1) of the conversion image area TME shown in FIG. 11A is set as the start pixel P.

Subsequently, an interval distance value N is set on the basis of the currently-selected conversion algorithm/parameter group in step SD3. As shown in FIG. 11A, the interval distance value N represents, by the number of pixels, the interval distance between the pixel P (1) set as the start pixel P and the pixel P (2) from which the conversion is subsequently started. The interval distance value N represents the degree of overlap between the brush-touch patterns HP. Subsequently, in step SD4, the color Cp of the start pixel P (pixel) from which the conversion is started is obtained in the image copied to the conversion original image area THE.

Figure 5A:
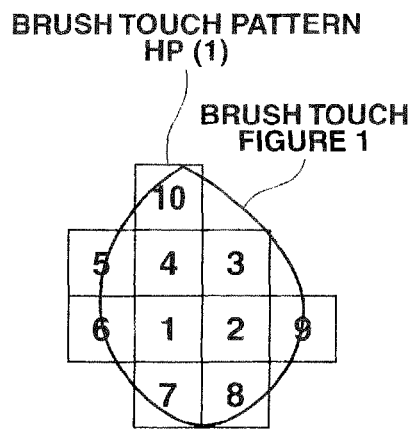
FIG. 5A is a diagram showing an example of a brush-touch pattern.
Figure 5B:
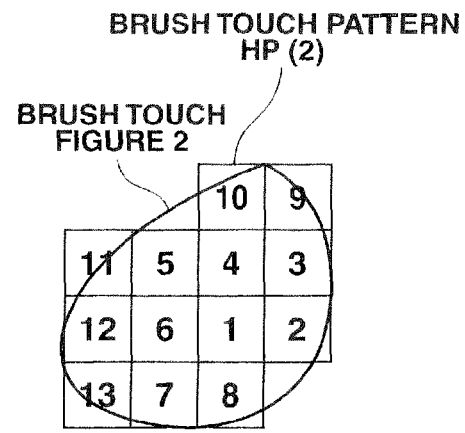
FIG. 5B is a diagram showing an example of a brush-touch pattern.
Figure 5C:
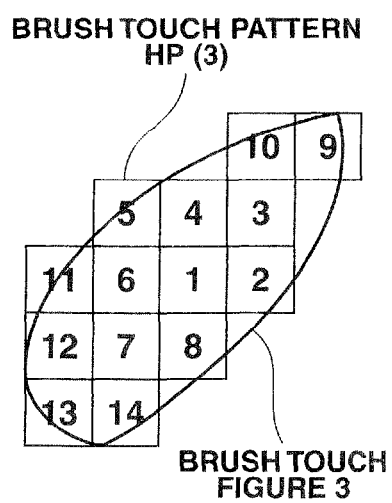
FIG. 5C is a diagram showing an example of a brush-touch pattern.
Figure 5D:
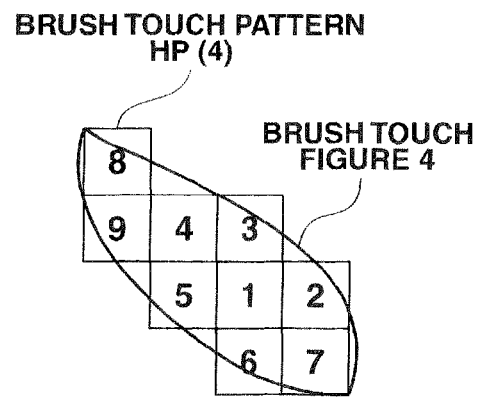
FIG. 5D is a diagram showing an example of a brush-touch pattern.
Figure 9:
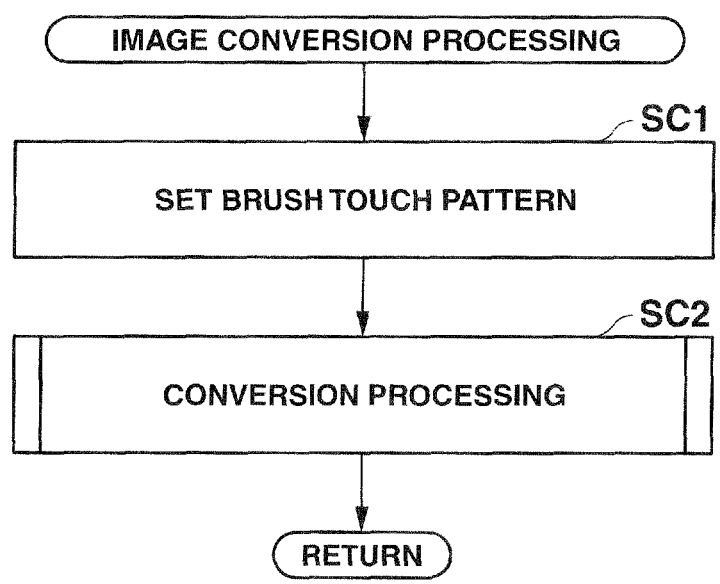
FIG. 9 is a flowchart showing an operation showing image conversion processing.

Then, in step SD5, an initial value "1" is set to a pointer n specifying a number of a pixel constituting the brush-touch pattern HP (1) set in the above step SC1 (see FIG. 9). Subsequently, in step SD6, the first pixel in the brush-touch pattern HP (1) is set at the pixel of the same position as the start pixel P of the conversion original image area THE. It should be noted that the brush-touch pattern HP (1) is constituted by ten pixels forming the brush touch FIG. 1 as shown in the example of FIG. 5A.

Subsequently, in step SD7, a pixel corresponding to the n-th pixel specified by the pointer n is searched in the brush-touch pattern HP (1) whose first pixel is positioned at the start pixel P. In step SD8, a judgment is made as to whether the found pixel is within the target image. When it is judged that the pixel is out of the target image, the judgment result becomes "NO", and step SD10 explained below is subsequently performed.

On the other hand, when the found pixel is within the target image, the judgment result becomes "YES", and step SD9 is subsequently performed, in which the color of the found pixel is set to the color Cp obtained in step SD4. Thereafter, step SD10 is subsequently performed, and the pointer n is incremented by a stepping movement.

Figure 11B:
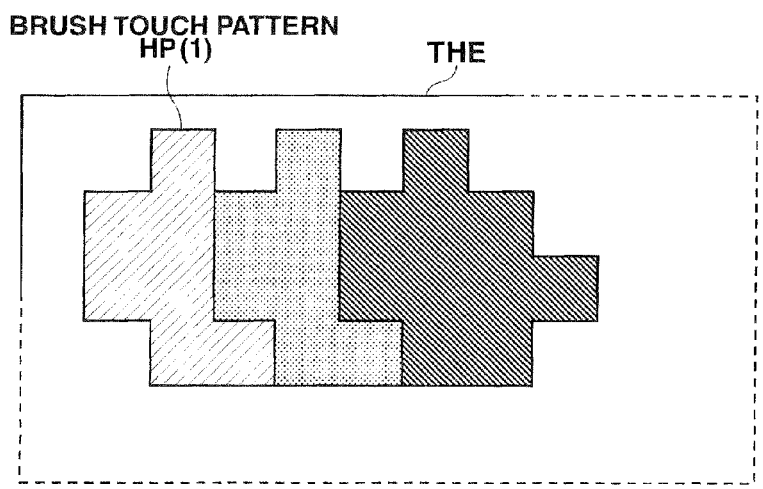
FIG. 11B is a diagram for explaining an example of an operation of image conversion processing.

Subsequently, in step SD11, a judgment is made as to whether the value of the pointer n after the stepping movement is equal to or more than the number of the final pixel in the brush-touch pattern HP (1), i.e., whether the colors of all the pixels constituting the brush-touch pattern HP (1) have been set. When the colors of all the pixels have not yet been set, the judgment result becomes "NO", and the processing returns back to step SD7. Thereafter, the steps SD7 to SD11 are repeated until the colors of all the pixels constituting the brush-touch pattern HP (1) have been set. As a result, in the case of the above example, as shown in FIG. 11B, the brush-touch pattern HP (1) in which the start pixel P at the position corresponding to the pixel P (1) is set as the first pixel is painted with the color Cp obtained in step SD4.

When painting with the brush-touch pattern HP (1) has been thus finished with respect to the first start pixel P (pixel P (1)), the judgment result made in step SD11 becomes "YES", and step SD12 is subsequently performed, in which the interval distance value N is added to the start pixel P (pixel P (1)), so that it is updated to a subsequent start pixel P (pixel P (2)). Then, in step SD13, a judgment is made as to whether the updated subsequent start pixel P (pixel P (2)) has reached the final pixel.

Figure 11C:
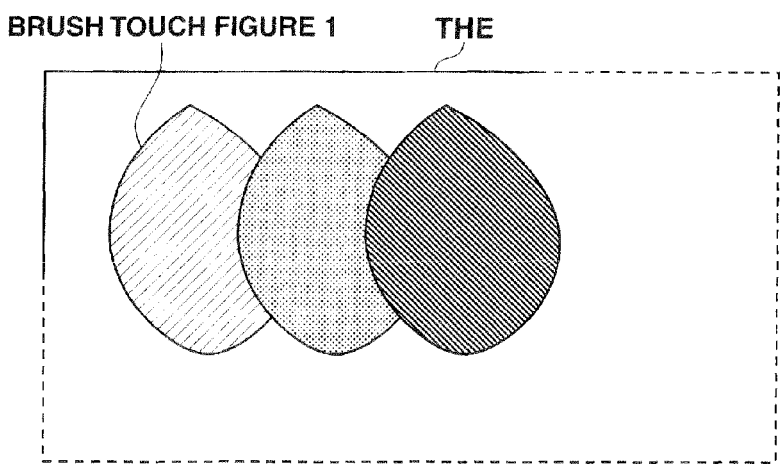
FIG. 11C is a diagram for explaining an example of an operation of image conversion processing.

When the updated subsequent start pixel P (pixel P (2)) has not yet reached the final pixel, the judgment result becomes "NO", and the processings of step SD4 and subsequent steps explained above are repeated. Therefore, when each of the pixels P(1), P(2) and P(3) arranged with the interval distance value N is set as the start pixel P as shown in FIG. 11A for example, the brush-touch patterns HP (1) in which these start pixels P are arranged as the first pixel are painted with the respectively obtained colors Cp and overlaid on each other as shown in FIG. 11B. As a result, the image is converted to oil painting painted with the touch of the brush touch FIG. 1 as shown in FIG. 11C. Then, when the updated subsequent start pixel P reaches the final pixel, the judgment result made in step SD13 becomes "YES", and the processing is terminated.

As described above, in the image conversion processing, the start pixel P arbitrary selected from the conversion target image (image region of the original image enclosed by the window image) copied to the conversion original image area THE is adopted as the start point, and the degree of overlap between the brush-touch patterns HP is determined so that the pixels chosen with the interval of the number of pixels (interval distance value N) are the start points of the patterns. The color Cp corresponding to the pixel at the start point of each pattern is obtained from the conversion target image, and the corresponding brush touch pattern is painted according to the obtained color Cp, whereby a tone of the image is converted to the oil-painting tone.

Therefore, when the window image is arranged to enclose a desired region of an original image (1) as shown in FIG. 13 for example, the region enclosed by the window image is displayed as an image whose tone has been converted to oil-painting tone as shown in FIG. 14. When the window image of a certain size is arranged at a position where a desired region of an original image (2) is enclosed by the window image as shown in FIG. 16 for example, the region enclosed by the window image is displayed as an image whose tone has been converted to oil-painting tone as shown in FIG. 17.

Either a configuration where the region enclosed by the window image is left as the original image while changing the position/size of the window image with the window movement command operation and/or the window size change operation by a user, or a configuration where the conversion processing is successively performed to the region enclosed by the window image even while changing the position/size of the window image may be adopted.

As described above, in the present embodiment, when the image region of the original image to which the image tone conversion is to be performed is specified with the window image, the image tone conversion is performed to the original image in the region enclosed by the window image, and then the image in the region to which the image tone conversion is performed is pasted to the image region enclosed by the window image to display the obtained image. At this occasion, the type of the conversion algorithm/parameter group used in the image tone conversion is changed to, e.g., "oil painting", "water color painting", and "pastel painting", in this order in accordance with the elapsed time since the window image arranged in the original image has been specified.

Therefore, by simply specifying the image region of the original image whose tone is to be converted to the image tone using the window image, a tone of the region enclosed by the window image is converted to different type of image tone, i.e., "oil painting", "water color painting", or "pastel painting", in this order every time the predetermined period of time passes, and the obtained image is displayed. As a result, a tone of a desired region of the original image can be easily converted to various kinds of image tones without trimming the image.

In the above embodiment, the painting conversion system including the user terminals 10 and the painting conversion server 20 has been explained. However, the gist of the present invention is not limited thereto. As long as each of the user terminals 10 has image processing performance equivalent to the painting conversion server 20, each of the user terminals 10 can operate in stand-alone execution environment without connecting to the painting conversion server 20 to convert a desired region of the original image to various kinds of image tones without trimming the image.

For the sake of simplifying the explanation, the bitmap format image is used in the present embodiment. However, the gist of the present invention is not limited to application to the bitmap format image. It is to be understood that the present invention can be applied to an image expressed in other data formats such as jpeg (registered trademark).

In the present embodiment, a tone of the original image in the region enclosed by the window image is converted to different type of image tone, i.e., "oil painting", "water color painting", or "pastel painting", in this order every time the predetermined period of time passes. However, the embodiment is not limited thereto. Alternatively, the tone of the region may be converted to these image tones in a circulating manner. In other words, the region may be converted to "oil painting", "water color painting", "pastel painting", "oil painting", and so on in this order.

In the above embodiment, the image tone conversion is performed to one region of the original image enclosed by the window image. Alternatively, a plurality of window images may be provided to enclose a plurality of regions of the original image to which the image tone conversion is performed by the window images respectively. In this configuration, tones of the regions respectively enclosed by the window images may be respectively converted to different image tones at a time. This allows the user to understand, at a glance, the type of image tone suitable for the original image.

In addition, in the embodiment, a program including a region specifying processing routine, an image tone specifying processing routine, an image converting processing routine, and a superimposing processing routine are previously recorded in a recording medium (not shown) for recording a program. It is possible to make the CPU 20A realize a region specifying function to specify a region of the original image to which the image tone conversion is to be performed, by the region specifying processing routine. It is also possible to make the CPU 20A realize an image tone specifying function to specify different type of image tone in accordance with the elapsed time since the region to which the image tone conversion is to be performed has been specified by the region specifying function, by the image tone specifying processing routine. Moreover, it is possible to make the CPU 20A realize an image converting function to convert the original image in the region specified by the region specifying function to the image tone specified by the image tone specifying function, by the image converting processing routine. It is also possible to make the CPU 20A realize a superimposing function to superimpose the image in the region to which the image tone conversion has been performed by the image converting function on the region of the original image specified by the region specifying function, by the superimposing processing routine.

What is claimed is:

1. An image tone conversion apparatus comprising:
   a region specifying section configured to specify an arbitrary region in an original image;
   a moving section configured to move the arbitrary region specified by the region specifying section to an arbitrary position in the original image;
   an image tone specifying section configured to specify any one of a plurality of image tones of different types with respect to the arbitrary region moved by the moving section; and
   an image converting section configured to convert only an image of the arbitrary region specified in the original image to the image tone specified by the image tone specifying section,
   wherein the image tone specifying section specifies the image tones of different types in order in accordance with an elapsed time from the moving of the arbitrary region by the moving section, and
   wherein the image converting section converts only the image of the arbitrary region specified in the original image into the image tones of different types in order as specified by the image tone specifying section in accordance with the elapsed time.

2. The image tone conversion apparatus according to claim 1, wherein the region specifying section includes:
   a size setting section configured to set a size of a frame-shaped image; and
   a position setting section configured to set a position of the frame-shaped image to be arranged in the original image, and
   wherein the region specifying section sets the frame-shaped image of the size set by the size setting section at an arrangement position in the original image set by the position setting section, and specifies a region of the original image enclosed by the frame-shaped image as the arbitrary region.

3. The image tone conversion apparatus according to claim 2, wherein the image converting section does not convert the image of the arbitrary region enclosed by the frame-shaped image in the original image while the size or the position of the frame-shaped image is being changed.

4. A non-transitory computer readable recording medium storing a program which is executable by a computer to perform functions comprising:
   a region specifying function for specifying an arbitrary region in an original image;
   a moving function for moving the arbitrary region specified by the region specifying function to an arbitrary position in the original image;
   an image tone specifying function for specifying any one of a plurality of image tones of different types with respect to the arbitrary region moved by the moving section; and
   an image converting function for converting only an image of the arbitrary region specified in the original image to the image tone specified by the image tone specifying function,
   wherein the image tone specifying function specifies the image tones of different types in order in accordance with an elapsed time from the moving of the arbitrary region by the moving function, and
   wherein the image converting function converts only the image of the arbitrary region specified in the original image into the image tones of different types in order as specified by the image tone specifying function in accordance with the elapsed time.

5. A system comprising;
   a terminal apparatus; and
   a server connected to the terminal apparatus via a network,
   wherein the terminal apparatus includes:
      a region specifying section configured to specify an arbitrary region in an original image;
      a moving section configured to move the arbitrary region specified by the region specifying section to an arbitrary position in the original image; and
      an image tone specifying section configured to specify any one of a plurality of image tones of different types with respect to the arbitrary region moved by the moving section, and
   wherein the server includes:
      an image converting section configured to convert only an image of the arbitrary region specified in the original image to the image tone specified by the image tone specifying section,
      wherein the image tone specifying section specifies the image tones of different types in order in accordance with an elapsed time from the moving of the arbitrary region by the moving section, and wherein the image converting section converts only the image of the arbitrary region specified in the original image into the image tones of different types in order as specified by the image tone specifying section in accordance with the elapsed time.

6. The image tone conversion apparatus according to claim 1, further comprising a size changing section to change a size of the arbitrary region to an arbitrary size.

* * * * *